(12) United States Patent
Mohammadi et al.

(10) Patent No.: US 12,275,185 B2
(45) Date of Patent: Apr. 15, 2025

(54) ADDITIVE MANUFACTURING BY EXTRUDING INHIBITED CRYSTALLIZATION POLYMERS

(71) Applicant: 3D Systems, Inc., Rock Hill, SC (US)

(72) Inventors: Meisam Shir Mohammadi, Charlotte, NC (US); Frank A. McKiel, Jr., Colorado Springs, CO (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 18/403,144

(22) Filed: Jan. 3, 2024

(65) Prior Publication Data

US 2024/0227282 A1 Jul. 11, 2024

Related U.S. Application Data

(60) Provisional application No. 63/478,790, filed on Jan. 6, 2023.

(51) Int. Cl.
*B29C 64/118* (2017.01)
*B29C 64/188* (2017.01)
*B29C 64/209* (2017.01)
*B29C 64/25* (2017.01)
*B29C 64/364* (2017.01)
(Continued)

(52) U.S. Cl.
CPC .......... *B29C 64/118* (2017.08); *B29C 64/188* (2017.08); *B29C 64/209* (2017.08); *B29C 64/25* (2017.08); *B29C 64/364* (2017.08); *B29C 64/393* (2017.08); *B33Y 10/00* (2014.12);

(Continued)

(58) Field of Classification Search
CPC ... B29C 64/118; B29C 64/188; B29C 64/209; B29C 64/25; B29C 64/364; B29C 64/393; B33Y 10/00; B33Y 30/00; B33Y 40/20; B33Y 50/02; B29K 2101/12; B29K 2995/004
See application file for complete search history.

(56) References Cited

U.S. PATENT DOCUMENTS

2015/0145168 A1* 5/2015 Rodgers ................. B29C 64/118
264/308
2018/0319079 A1* 11/2018 Eyal ....................... B29C 64/106
(Continued)

FOREIGN PATENT DOCUMENTS

JP 2019025761 A 2/2019

OTHER PUBLICATIONS

Andrea Costanzo, Umberto Croce, Fused Deposition Modeling of Polyamides: Crystallization and Weld Formation, Dec. 14, 2020, Polymers 2020, 12(12), 2980; https://doi.org/10.3390/polym12122980 (Year: 2020).*

(Continued)

*Primary Examiner* — Seyed Masoud Malekzadeh
*Assistant Examiner* — Xinwen Ye

(57) ABSTRACT

Methods and processes are provided by which inhibited-crystallization polymers may be employed as feedstock materials in thermoplastic extrusion-type additive manufacturing systems. Counteracting the tendency of such polymers to uncontrolledly settle into an amorphous state upon cooling under typically used conditions, techniques are disclosed for controlling process temperatures, exposure times and feed rates to produce parts with uniform crystallinity, high mechanical strength and efficient throughput.

13 Claims, 10 Drawing Sheets

(51) Int. Cl.
  *B29C 64/393* (2017.01)
  *B29K 101/12* (2006.01)
  *B33Y 10/00* (2015.01)
  *B33Y 40/20* (2020.01)
  *B33Y 80/00* (2015.01)

(52) U.S. Cl.
  CPC .............. *B33Y 40/20* (2020.01); *B33Y 80/00* (2014.12); *B29K 2101/12* (2013.01); *B29K 2995/004* (2013.01)

(56) References Cited

U.S. PATENT DOCUMENTS

| | | | |
|---|---|---|---|
| 2019/0225808 A1* | 7/2019 | Naskar | B29C 64/118 |
| 2021/0269629 A1 | 9/2021 | Liu et al. | |
| 2022/0016828 A1 | 1/2022 | Rodgers et al. | |
| 2022/0161496 A1 | 5/2022 | Liu et al. | |
| 2022/0410468 A1* | 12/2022 | Hikmet | F21K 9/90 |

OTHER PUBLICATIONS

Xu Zhang et al., "Fused deposition modeling 3D printing of polyamide-based composites and its applications", Composites Communications, vol. 21 (Oct. 2020), Article 100413. doi:10.1016/j.coco.2020.100413 (12 pages).

Masoumeh Pourali et al., "A tale of two polyamides: Comparing the crystallization kinetics of a hot-melt adhesive and a PA 6/66 copolymer", Thermochimica Acta, vol. 710 (Apr. 2022), Article 179176. doi: 10.1016/j.tca.2022.179176 (10 pages).

Masoumeh Pourali et al., "Fused filament fabrication of void-free parts using low viscosity hot melt adhesives", Additive Manufacturing, vol. 46 (Oct. 2021), Article 102110. doi: 10.1016/jaddma.2021.102110 (11 pages).

PCT International Search Report for International Search Authority for PCT/US2024/010175, mailed Apr. 10, 2024 (5 pages).

PCT International Written Opinion for International Search Authority for PCT/US2024/010175, mailed Apr. 10, 2024 (8 pages).

English translation of Japanese Publication JP 2019025761A; EPO on Apr. 4, 2024 (15 pages).

* cited by examiner

ADDITIVE MANUFACTURING BY EXTRUDING INHIBITED CRYSTALLIZATION POLYMERS

RELATED APPLICATIONS

The present application claims the benefit under 35 U.S.C. 119(e) of U.S. provisional patent application No. 63/478,790, which was filed on Jan. 6, 2023 and is incorporated by reference herein.

TECHNICAL FIELD

Embodiments of the technology relate, in general, to processes for fabricating an object from a thermoplastic via additive manufacturing and, more specifically, to adapting an extrusion-based printing process to utilize a class of thermoplastics having favorable properties for powder bed fusion.

BACKGROUND

In the field of additive manufacturing, various types of thermoplastics have been widely used as one feedstock material from which to form three-dimensional objects. One such additive manufacturing process, known as powder bed fusion (PBF), produces spatial structures by using a laser to sinter selected portions of powdered starting material. In this process, unconsolidated loose powder is progressively deposited in thin layers within a container. An object is successively built up layer-by-layer by using patterned radiation from a laser. After each layer of powder is deposited, the laser is controlled to selectively irradiate only the areas that, according to a digital model of the object, are needed to melt, coalesce and re-solidify to form the object within the powder. Areas where the laser does not strike remain in a powdered solid state.

To shorten turnout times when using this process, thermoplastic formulations have been developed that have lower melting temperatures and greater differences between the fusion temperature and the solidification temperature of the material. Lowering the solidification temperature allows the powder vat to operate at a lower overall temperature and therefore shortens the cooling time needed for final solidification and equilibration with room temperature to allow part removal. Increasing the difference between fusion and solidification temperatures can reduce part defects, such as curling and clumping, sometimes experienced with PBF.

Aside from their special properties that particularly benefit PBF processing, these thermoplastic formulations may offer desirable mechanical properties, such as high elongation before breaking and impact absorption, as well as useful electrical properties, chemical properties, achievable surface finishes, frictional characteristics, etc. Other additive manufacturing processes, such as layered extrusion onto an open substrate, could benefit from employing this class of plastics, either in pure form or in combination with other polymers or fillers that contribute complementary properties.

While these polymers offer many favorable characteristics, they behave differently than conventional polymers used for extrusion-based processes. To extend the beneficial properties of these species to extrusion-based additive manufacturing, adapted techniques are needed for controllably extruding these polymers in view of their low processing temperatures and tendency to supercool.

SUMMARY

The present teachings provide specific methods for determining usable extrusion parameters, and processes based thereupon, for extruding a polymer having a suppressed crystallization characteristic, or what may be termed an inhibited-crystallization polymer (ICP). In some cases, the rationale for successfully printing with an ICP is contrary to common practices applied to other thermoplastics. In particular, methods of choosing printing parameters in accordance with some embodiments provide for adjusting nozzle temperature to well above a point that permits flow of the material, and even to a further elevated temperature at which the material exhibits a sigmoidal or plateau-like shift in one or more mechanical properties. To further improve extrusion printing of ICP species, in accordance with some embodiments, a feed rate is adjusted to improve printing speed, while also maintaining stability of stacked layers, after said nozzle temperature adjustment. By applying the principles taught herein, the attainable feed rate is improved over extruding at just above a flowable nozzle temperature. Additional variations also provide for annealing of deposited ICP material to reliably achieve a degree of crystallinity in an additively manufactured object or article.

BRIEF DESCRIPTION OF THE DRAWINGS

Various exemplary embodiments are illustrated by way of example, and not by way of limitation, in the following detailed description, claims and accompanying drawings, in which like reference numerals refer to similar elements and in which:

DETAILED DESCRIPTION

Figure 1:
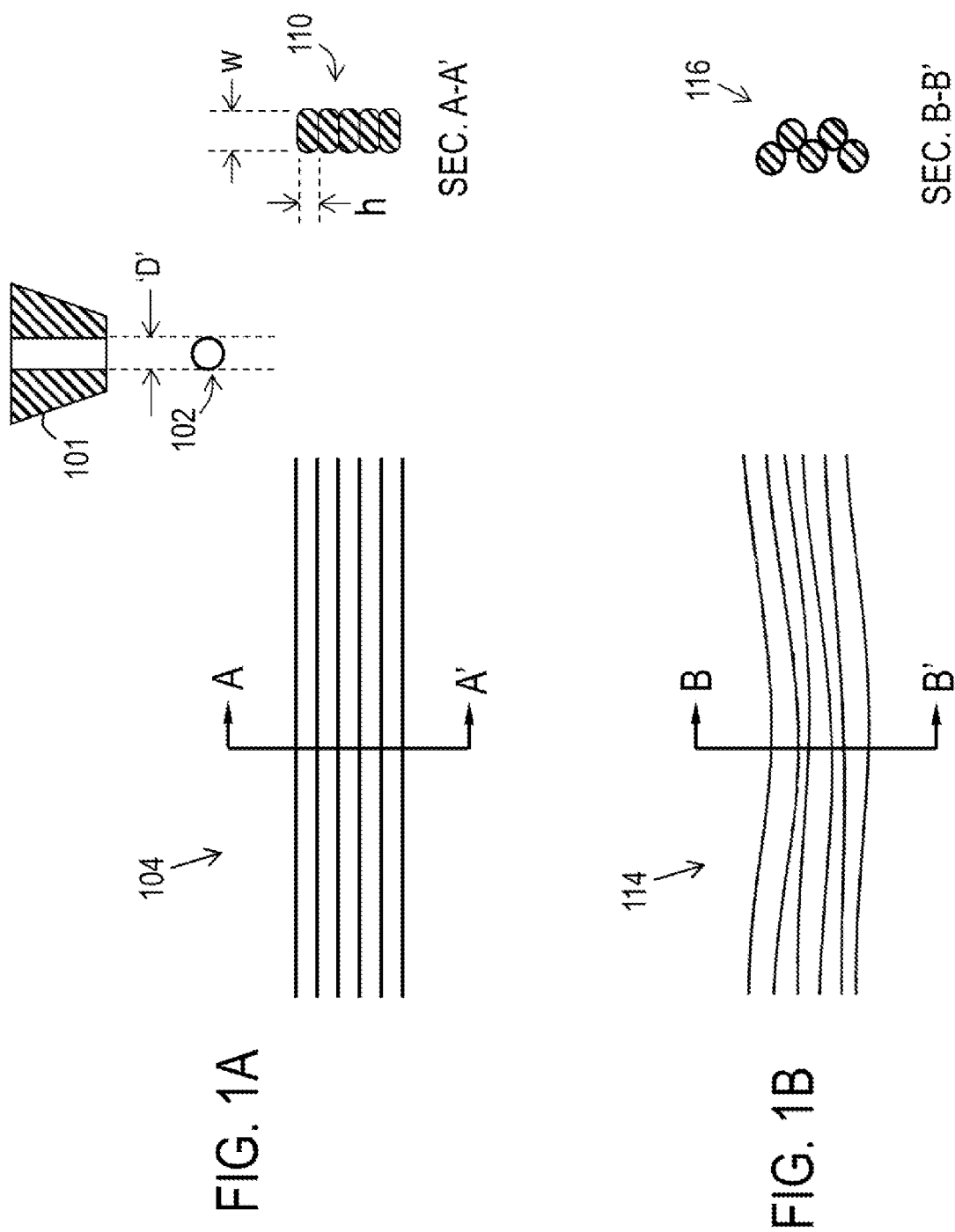
FIGS. 1A and 1B are pictorials of normal and abnormal assemblies of extruded beads of thermoplastic material.

To facilitate a better understanding of the present invention, the following description provides a brief overview of both powder bed fusion and extrusion additive manufacturing processes before explaining how a class of thermoplastics formulated to improve the former process may be applied to the latter process in accordance with illustrative embodiments.

Using the powder bed fusion process, an object is formed by applying a polymer powder in a thin layer to a vertically movable plate of a sintering chamber, which is normally heated to a temperature slightly below the melting point of the polymer. The layer thickness is chosen in such a way that a melting layer is formed during or after the subsequent laser sintering. The laser sinters the powder particles according to the specifications of the controlling computer. After that, the plate is lowered by the amount of the layer thickness, usually 0.05 to 2.0 mm. With the application of a new powder layer, the process is repeated. After the completion of a preselected number of cycles according to the intended number of layers, a block has been formed, which externally consists of powder. Inside, it houses a highly viscous melt or an already largely solidified block in the shape of the desired molded part. Non-melted areas where the powder is still in solid form stabilize the shape of the melt. After that, the block, consisting of both the selectively melted portions and the powdered remainder, is slowly cooled, and the melt fully solidifies when it falls below the solidification temperature of the polymer.

It is advantageous to keep the block at the solidification temperature until the solidification phase transformation is completed. This is achieved by selecting a low cooling rate in the temperature range of the phase transformation, so that the released heat of solidification keeps the molded body inside at exactly at the solidification temperature until the phase transformation is completed. After cooling, the block is removed from the sintering chamber and the molding body is separated from any unsolidified loose polymer powder. In practice, this cooling may require 1-2 days. If the solidification temperature of the polymer is comparatively high, then the cooling process takes correspondingly longer.

As mentioned above, to shorten turnout times when using this process, thermoplastic formulations have been developed that have lower melting temperatures and greater differences between the fusion temperature and the solidification temperature of the material. Lowering the solidification temperature allows the powder vat to operate at a lower overall temperature and therefore shortens the cooling time needed for final solidification and equilibration with room temperature to allow part removal. Increasing the difference between fusion and solidification temperatures can reduce part defects, such as curling and clumping, sometimes experienced with PBF.

Thermoplastics with lowered solidification temperatures characteristically exhibit inhibited or impeded formation of crystallinity, reduced ultimate crystallinity and correspondingly reduced energy release upon crystallization. These material characteristics are a function of molecular structure.

Many common species of thermoplastics, such as nylon 66, comprise polymer chains with frequently-spaced and regularly-patterned functional groups such that adjacent chains of this polymer very strongly engage in mutual hydrogen-bonding. Polymers having regularly spaced functional groups tend to achieve comparatively high degrees of crystallinity, to retain considerable crystallinity at elevated temperatures and to readily restore increased crystallinity as they cool after reaching higher temperatures as may be needed to achieve a molten, flowable or fusible state. Given the regularity and frequency of functional groups along each polymer chain, a mass of such chains can readily settle into an optimum alignment of polar functional groups and achieve a corresponding lower energy state.

When a polymer chain having an aperiodic spacing of functional groups is produced, such as by randomly varying the number of intervening $CH_2$ units between carbonyl-amine pairs in a polyamide chain, there is far less opportunity to form an optimal or strongly favored alignment and less spontaneity in seeking such an optimum alignment. This lack of regular spacings among hydrogen bonding counterparts results in a polymer characterized by generally lower crystallinity, lower energy change as crystallization occurs and considerable reluctance to reforming crystalline alignments of polymeric chains as the material cools from a molten, flowable or fusible condition. Copolyamide 6/12 produced by random copolymerization is one example of a polymer having aperiodic spacings of functional groups. For example, ring opening polymerization of 6-carbon and 12-carbon species in a common reaction chamber may result in such a polymer. Some polymers may also have sidechains and substituents that further interfere with the formation of highly regular crystalline domains and therefore contribute to lowering solidification temperature.

Polymers of the latter type, having aperiodic spacings of functional groups or other attributes that inhibit crystallization and lower solidification temperatures, may offer desirable mechanical properties, such as high elongation before breaking and high impact absorption, as well as useful electrical properties, chemical properties, achievable surface finishes, frictional characteristics, etc. Consequently, there may be applications for these polymers independently of their special properties that particularly benefit PBF processing. For example, there may be other additive manufacturing processes, such as layered extrusion onto an open substrate, that could benefit from employing this class of plastics, either in pure form or in combination with other polymers or fillers that contribute complementary properties.

One characteristic of at least some inhibited crystallization polymers (ICPs) is the tendency to supercool when processed outside of the highly uniform temperatures and slow cooling environment of a PBF chamber. When extruded into open air, these materials may rapidly cool into an amorphous form but may also, in denser portions of an additively manufactured object, achieve a more crystalline form resembling the end result of PBF processing. These alternative forms are both stable at room temperature but exhibit dramatically different mechanical properties. Without proper controls, a single object constructed by additive extrusion of an ICP may inadvertently contain both forms or be entirely made of the wrong form for an intended application. Another aspect of at least some inhibited crystallization polymers is reverse-sense response to temperatures and feed rates compared to conventionally extruded polymers. In practice, control of print parameters to correct observable printing issues has often proven to be elusive or counterintuitive, leading to a perception that the material is not suitable for extrusion printing.

Inhibited crystallization polymers offer many favorable characteristics but they behave differently than conventional polymers used for extrusion-based processes. To extend the beneficial properties of ICP species to extrusion-based additive manufacturing, adapted techniques are needed for controllably extruding these polymers in view of their low processing temperatures and exceptional tendency to supercool.

To facilitate explanations of methods for selecting parameters in accordance with the present teachings, the fundamental parameters affecting additive manufacturing (AM) by thermoplastic extrusion (commonly referred to as one form of '3D printing') are briefly reviewed below. These same factors are generally applicable to both filament-fed and pellet-fed extruders. For convenience in the discussion that follows, additive manufacturing systems using thermoplastic extrusion shall be called '3D printers' even though it is acknowledged that other AM technologies may qualify under the same moniker and that some extrusion-based AM systems may comprise cutting tools or other material-removal implements.

Variables affecting a polymer extrusion include both static pre-conditions and variable parameters that are adjustable for each build or during a given build process. A brief review of the key parameters used for adapting to different materials in thermoplastic extrusion will facilitate explaining the salient aspects of the invention.

The important pre-conditions for the present discussion (aside from selecting from among different build systems, build envelopes and the like) are nozzle size and layer height. The nozzle size, though changeable for a given 3D printing system, is a physical characteristic established at the outset of planning to additively manufacture an object from a digital data model of the object. The nozzle size is used as input to a tool path planning tool, a software application known as a 'slicer', which determines a sequence of relative movements between an extruder and other components in the build space of the 3D printing system that will result in forming the object according to the digital data model. Specifically, the nozzle size (usually expressed as the exit diameter in millimeters) must be specified so that the slicer algorithm can properly space adjacent 'beads' or 'traces' of the material being extruded through the nozzle.

Furthermore, in the course of planning how to extrude deposits into progressive layers of appropriate shape, the slicing software must consider the height of each layer. Even though some slicing software allows for varying this height value layer-by-layer, the layer height is generally unable to be altered at the printer or 'on-the-fly' as the building of an object proceeds. The assembly of motion instructions prepared by a slicer is predicated on established layer heights and, once these layer-wise instructions have been calculated, compiled and queued up in the motion control system of a 3D printer, any alteration in layer height could not be reasonably performed without either affecting the object shape or revisiting the slicing function.

Once the above pre-conditions are decided and a model of an object has been 'sliced' resulting in a list of motion instructions, several other parameters attendant to extrusion 3D printing are subject to adjustment before and during a build process. Many of these parameters have initial values set by the slicer but are also alterable at the 3D printer, either in preparation for a build or as 'tunable' settings during a build.

One of the most important parameters for 3D printing by extruding thermoplastics is the extrusion temperature or nozzle temperature. The nozzle temperature may be set to a target value and thermostatically controlled through the use of electrical heating elements, temperature sensor(s) and automatic controllers.

Pellet-fed extruders use a rotating auger within a heated barrel to drive molten thermoplastic through a discharge opening in a nozzle and employ one or more temperature-controlled heating stages. The final heating stage is assumed to most closely represent the discharge temperature, though this temperature may also be influenced by flow rates and by pressure-induced heating within the extruder.

The nozzle temperature 'setpoint' that is adjusted by an operator of a 3D printer is assumed to closely correspond to the actual temperature of the extruded plastic that issues from the nozzle. The absolute calibration of the nozzle temperature sensor is often quite poor, but relative tuning adjustments often suffice for an operator to 'dial in' a workable temperature setting, mostly based on observation, when printing with a given plastic material on a particular printer. With most 3D printers, the nozzle temperature setpoint is adjustable by an operator even as a build process proceeds. The motion instructions from a slicer may include temperature setpoints, but an operator's tuning input overrides such setpoints, unless and until the instruction interpreter subsequently encounters another temperature-setting instruction that overrides the operator's setpoint.

Nozzle temperature setting is most influenced by which thermoplastic species is to be printed to form an object. An optimal range of nozzle temperature settings is often declared by manufacturers of thermoplastic filaments.

Another essential parameter often tuned by an operator during 3D printing is so-called 'feed rate'. As in the field of CNC machining systems where the term originated, the feed rate for 3D printers relates to the linear speed (often expressed in millimeters per minute) of lateral movements of, for example, an extrusion nozzle relative to the print bed or workpiece. This is especially important to control while extruding a continuous a bead of material. Adjustment of the general feed rate during a build process acts by scaling any per-instruction feed rates that were encoded into the movement instructions by the slicer. When an operator adjusts the global normalized feed rate from 100% to 90%, for example, all lateral movements, along with extrusion drive motions, slow down by 10%. This speed adjustment does not change what will be ultimately constructed but does affect how long the complete build will take. Under some circumstances, an operator may adjust feed rate to resolve observed problems with heat buildup, interlayer adhesion, warping, build plate adhesion or stringiness.

Slicers may also vary encoded feed rates at specific points to address issues, such as heat buildup, that can be anticipated for extremely low-volume layers. This relates to what may be considered an indirect build parameter known as 'recoat time'. If a first extruded deposit is still nearly molten when a subsequent heated deposit is applied on top, the result can be a slumping downward of both deposits or disruption and peeling up of the first deposit. Sometimes this effect is so severe that the deposits cling to the nozzle tip and draw away from the workpiece location where they were intended to have been deposited. 'Recoat time' refers to how much time elapses between the depositing of a first layer and the depositing of a subsequent layer on top of the first layer. Additively constructing a given object may involve some layers that have very large cross-sectional areas and others that have very small cross-sectional areas. A feed rate that is useful for covering a large area, such as 10,000 mm$^2$, for one layer of a build may present a problem for a later layer of the build that reduces to a pinnacle of only, say, 10 mm$^2$.

Without some reduction in feed rate to delay the recoating, the extrusion process could attempt placing molten layer upon molten layer. Thus, a 'minimum recoat time' is provided as a setting in many slicers and the enforcement of the recoat time limitation is encoded by localized feed rate data included in the build instructions given to the 3D printer. Consequently, adjustments to overall feed rate during a build will incidentally have a proportionate effect on recoat times. Feed rate and recoat time are generally interrelated and greatly dependent upon part layer shape.

Coupled with feed rate, another essential parameter is the 'flow rate', meaning the amount of material forced out of the end of the nozzle per unit distance of lateral travel. For most thermoplastics, the flow rate is a fixed ratio to achieve a bead of nominal size and shape (for adhesion and stability) for the given combination of nozzle size and layer height. This ratio is largely independent of what plastic species is being extruded and deposited. The combination of feed rate and flow rate imply a rate at which thermoplastic material must attain a molten state, be discharged from the nozzle and, in effect, cool and solidify. The physics of fluid flow and phase change place a practical limit on the achievable combinations of feed rate and flow rate, though this limit may differ according to thermoplastic species and what additives or fillers are present.

Some thermoplastic extrusion 3D printers offer a 'heated bed', meaning that the blank build surface upon which the additive construction of an object is initiated can optionally be elevated to a controlled temperature above room temperature. Doing so usually increases adhesion between a first deposited build layer and the build surface, which are made of different materials to enable part removal. A heated bed also lessens the tendency for some materials, such as ABS, to warp as they cool and solidify.

As yet another step toward lessening temperature change and part stresses during printing, a heated enclosure involves heating the entire build space surrounding the part being built. The higher ambient temperature reduces thermal shock and promotes adhesion by keeping the already-deposited surfaces somewhat energized, but this practice can also require increasing the recoat times mentioned earlier.

Ideally, the pre-conditions and adjustable parameters just described are adjusted to work in concert so that a given thermoplastic feedstock material can be efficiently deposited by a 3D printer to render any given object shape with good definition and structural properties. This requires extruding well-defined, precisely positioned beads of material that readily solidify after being deposited and that also firmly adhere to one another. A desirable form of extruded bead is depicted in FIG. 1A. Extrusion nozzle 101 is shown in cross-section as having a discharge opening of diameter 'D', which often measures in the range of 0.2 mm to 0.8 mm for desktop printers and as large as 6 mm for large-format industrial printers. A separate cross-section of extruded material 102 is presented to show that, before contacting external surfaces, the extrudate is generally round or cylindrical as it issues from the nozzle, and of very nearly the same diameter as the nozzle's discharge opening.

Cross section view 110 represents a wall (shown vertically or at least along the same direction as layers are applied) of stacked extruded beads that have been progressively applied in a layered build process. In the course of forming an object by extruding plastic as continuous beads that, in turn, form layers, the otherwise round or cylindrical extruded plastic is pressed into the more oblate form shown in cross section view 110. This deformation increases contact area between progressively stacked layers, promotes adhesion and lends mechanical stability in much the same way that, when constructing buildings, flat-surfaced bricks more readily form a stable vertical wall than rounded stones. The deformation of the cylindrical extruded trace from the nozzle into the flattened form shown in view 110 generally results in a deposited bead having a width 'w' that is 1.5 to 2 times the bead height 'h' (which equals the layer thickness.)

A single-bead-width wall is not just a sensitive test of trace stacking stability but a practical necessity. It is frequently encountered in the instructions that slicers prepare for extrusion printing. Many object constructions are of a single bead wall thickness (enabling a seamless 'spiral build') or comprise portions that are of stacked single beads. Most notably, the most common construction style in thermoplastic 3D printing is forming an outer 'shell' of a certain number of parallel extruded perimeters and, for rigidity, filling the interior with a less dense grid pattern of thin single-bead walls. The ability to form stable single bead walls of any arbitrary height is critically important to the success of most thermoplastic extrusion prints and is relied upon by slicing software.

When viewed from the side, a well-formed single-bead width wall should have a regular, ribbed appearance as shown in image 104. The vertical spacing evident in this image corresponds to the incremental layer thickness for the build and each horizontal band is an extruded bead or 'trace' as seen from the side.

Whereas FIG. 1A depicts an ideal stacking of successively deposited beads of material, FIG. 1B represents a defective condition that may be caused by improper parameter settings for a given thermoplastic.

FIG. 1B shows what may be termed 'sagging' or 'slumping' of deposited traces. With conventional thermoplastics most often used for 3D printing (such as PLA, ABS, PETG), this defect can be caused by excessive nozzle and enclosure temperatures, as well as recoating too frequently. All of these temperature-raising influences may keep the thermoplastic at such a low viscosity that it does not have enough structural integrity to support itself and each trace continues to flow under the pull of gravity well after being deposited. This sagging appearance is typified in the side view image 114.

Another source of instability can give rise to this sagging appearance wherein the initially cylindrical extrusion coming from the nozzle fails to fully deform and stack in the manner shown in FIG. 1A. Due to many possible factors such a residual viscosity, poor cohesion with colder traces, on-axis tension on the extrudate caused by a rapidly moving nozzle or auxetic properties of the extrudate as it comes under tension, each extruded bead fails to fully settle into alignment with the trace below. Instead, as is evident in cross section view 116, each successive trace exhibits a lateral displacement indicative of a force that opposes alignment and complete deformation into the expected aspect ratio. Because the extruder nozzle continues to follow the programmed path for where the trace should be deposited and the perturbation amplitude and direction depends on the trace below, this system of successive traces exhibits negative feedback and enters into an oscillatory behavior that intensifies as the wall of traces is built higher. This effect can accumulate to an extreme disturbance such as complete drooping or sagging of extruded traces similar to what was shown in side view 114.

The instabilities explained in connection with FIG. 1B allow a better understanding of the tabular data presented next.

Figure 2:
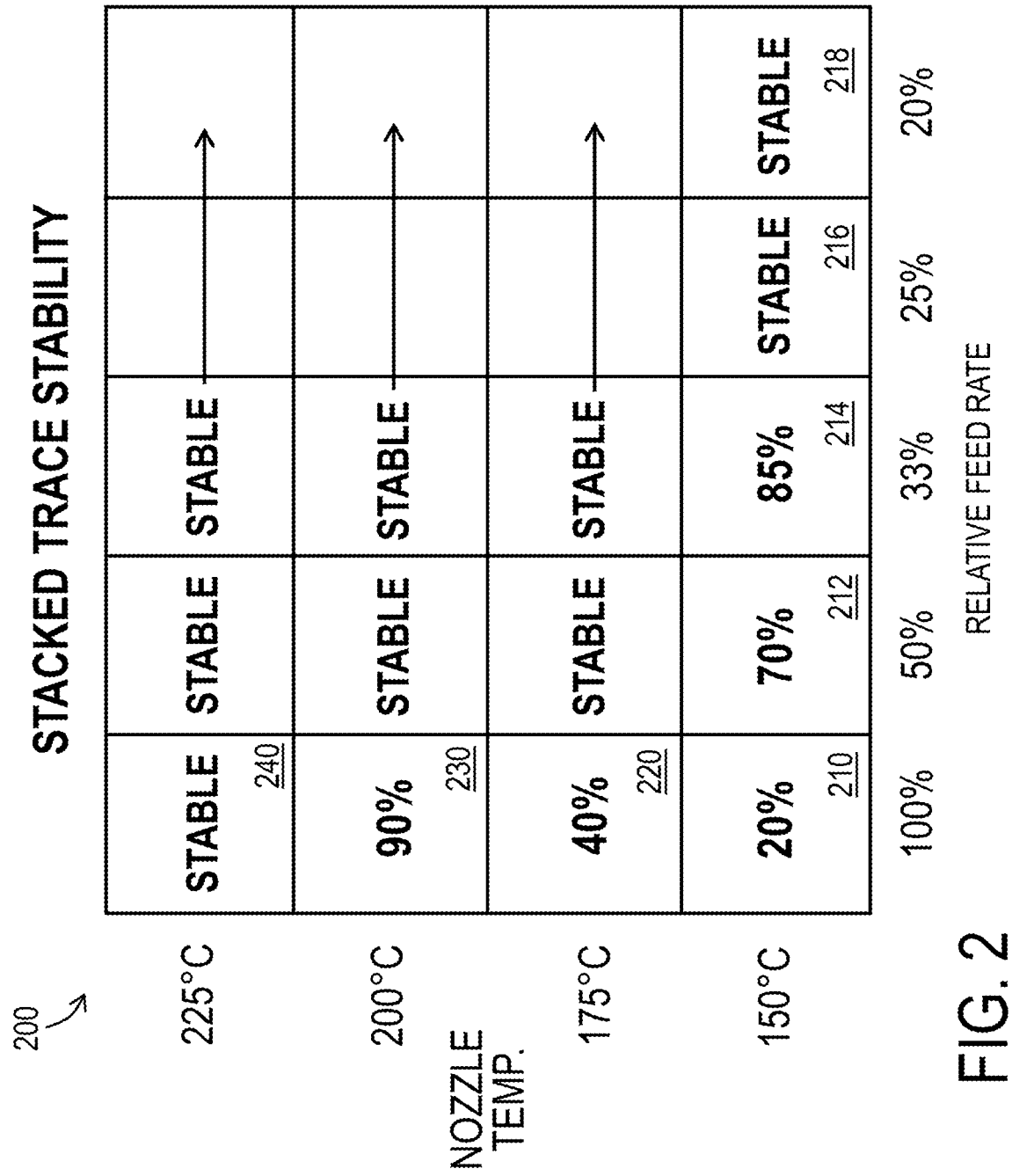
FIG. 2 is a table of stability observations for an inhibited crystallization polymer under varying extrusion conditions.

FIG. 2 is a table of stability observations for test samples printed with an ICP at various combinations of nozzle temperature and relative feed rate. The samples were 80 mm-tall single-bead walls using a 2 mm nozzle and a 1 mm layer height.

Each position in table 200 contains an indication of whether the resulting stack, printed using the intersecting combination of nozzle temperature and feed rate conditions was regular and stable or, if not, what percentage of the wall was regular and stable before instability set in.

The value in lower left position 210, under the conditions of 150° C. nozzle temperature and running at 100% (normalized to 3618 mm/min), reflects very poor stability in that only 20% of the wall's height was printed with some success before instability patterns, particularly resembling FIG. 1B, became prominent. Examining the bottom row of entries in positions 210 through 218 shows a consistent trend toward better stability as the feed rate is scaled back. This indicates that the reluctance for the material to reshape and conform to the nominal bead shape and to align with a previous trace may be accommodated by slower extrusion speeds and slower lateral feed rates. Of course, this means that successful printing at this temperature may be undesirably slow and inefficient. (Based on other measurements of mechanical properties, printing at this temperature also creates a generally weaker part.)

Returning to the lower left entry at position 210, another improvement trend is apparent from the column of values at positions 210, 220, 230 and 240. These values are obtained at the full normalized feed rate but at progressively higher nozzle temperatures.

Importantly, this trend within the column reveals an unusual property of ICP species that distinguishes them from more commonly printed thermoplastics and necessitates an alternative methodology for parameter selection. When attempting to print with an ICP, extruding at too low of a nozzle temperature results in sagging of extruded beads, which is a behavior that is normally indicative of excessive nozzle temperature in other, more commonly extruded materials. Consequently, the prevailing wisdom in operating 3D printers would call for lowering the nozzle temperature setpoint when, as evident in table 200, only increasing the nozzle temperature by some 25-50° C. will yield favorable improvement.

Operators of 3D printers, whether working with a familiar or unfamiliar feedstock material, frequently increase nozzle temperature just until satisfactory flow is obtained and interlayer adhesion appears adequate. Excessive nozzle temperature is avoided for most plastics as it can cause stringiness, structural instability and 'overheated' or discolored surface finishes due to degradation. Furthermore, in practice, temperature sensing elements are rarely calibrated to traceable standards and adjusting a temperature controller to a given setpoint does not guarantee an accurate nozzle temperature. Operators often compensate purely by observation.

An operator extruding an ICP material and observing sloppy and sagging traces, as noted under the conditions of position 210, may incorrectly conclude that excessive temperatures and/or short recoat times are to blame and may compensate by lowering nozzle temperature and slowing the printing speed. In actuality, faster feed rates and shorter recoat times may be sustainable if the nozzle temperature is increased. This parameter interaction is contrary to what is observed of typical thermoplastics and leads in the direction of wrong corrective actions if conventional behavior is assumed.

Thus, in accordance with the present teachings, the observation of instability at just above a nozzle-flowable temperature should instead prompt an increase in nozzle temperature to improve stability. This action also eliminates the need to compromise on feed rate.

Figure 3:
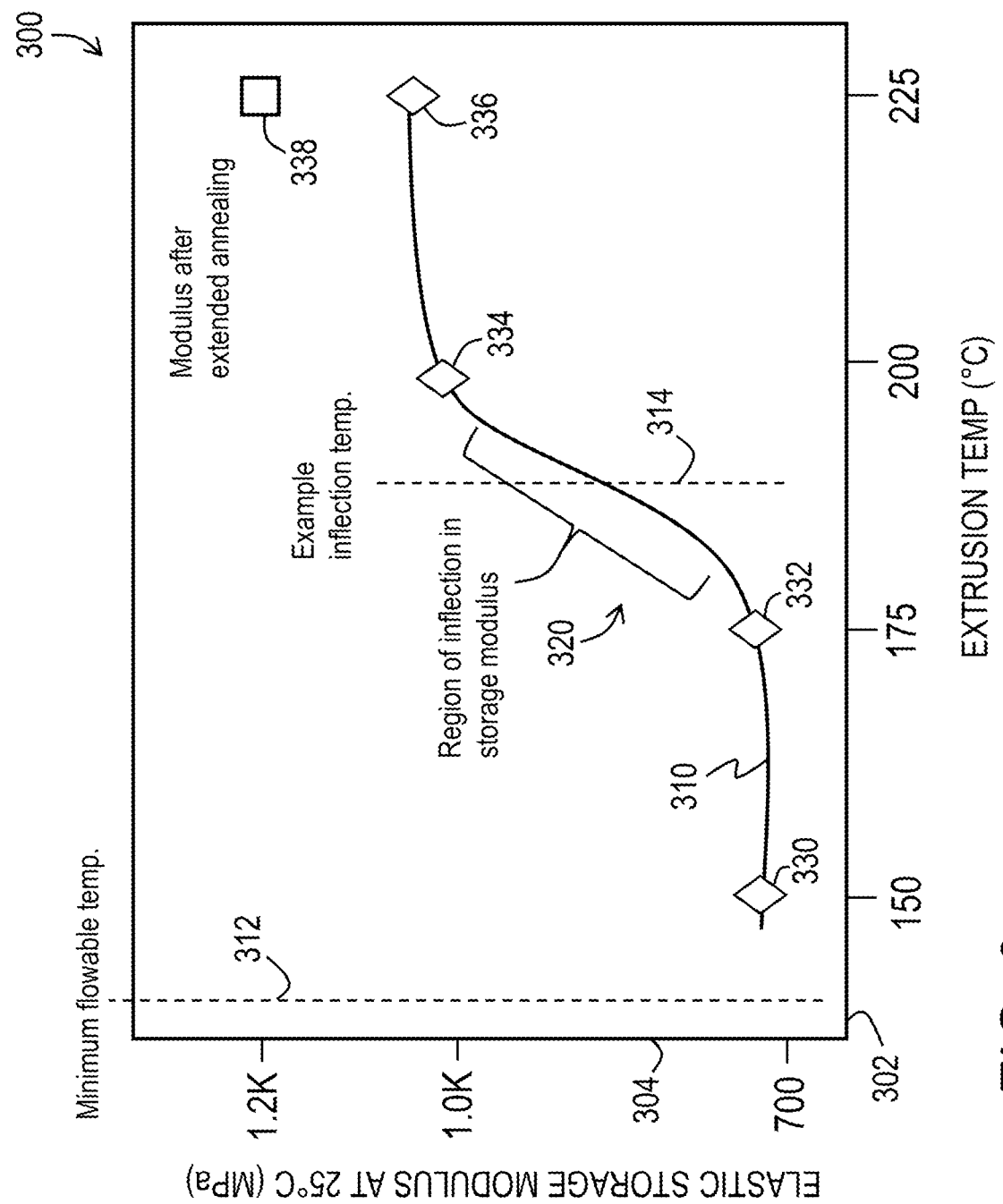
FIG. 3 is a graph of a post-extrusion mechanical property as a function of extrusion temperature, portraying a transitional temperature range applicable in some embodiments of the present invention.

A graph 300 of a temperature-dependent mechanical property shown in FIG. 3 highlights another unique characteristic when extruding ICP feedstocks. In FIG. 3, horizontal axis 302 represents nozzle temperature at the time of printing and vertical axis 304 represents a mechanical property, in this case an elastic response or storage modulus of the deposited material after it has cooled to room temperature (25° C.)

A high storage modulus value indicates a resilient material that returns to its initial shape after a distorting force has been applied and removed. A low storage modulus value indicates a material that, like modeling clay, remains displaced after a distorting force has been applied and then been removed.

For reference in FIG. 3, a vertical line 312 indicates a minimum temperature at which the ICP becomes reasonably 'flowable' through a 2 mm nozzle using practical available driving pressure such as that generated by a gear motor-driven auger rotating within a barrel of a pellet-fed extruder. For illustrative purposes this minimum flowable temperature is taken to be around 140° C.

Plotted curve 310 represents how the resiliency of the ICP material after being extruded and cooled changes as a function of the nozzle temperature used when depositing the material. Specifically, plotted curve 310 shows that the storage modulus is low when printing occurs below a certain temperature range and is high when the printing has taken place above the temperature range. Storage modulus at 25° C. is one type of post-printing mechanical property measurement reflecting how final product material properties are affected by extrusion parameters.

Data points 330 and 332, resulting from nominal nozzle temperatures of 150° C. and 175° C., respectively, indicate a relatively low storage modulus of around 700 MPa. Data points 334 and 336, resulting from nominal nozzle temperatures of 200° C. and 225° C., respectively, reflect a marked shift upward in storage modulus at around 1000 MPa.

The curve of storage modulus (S) versus nozzle temperature (T) joining these lower and higher plateaus is approximated to be sigmoidal in shape and exhibits a first derivative (dS/dT) that has a maximum value around the middle of the transition, estimated to be near the reference line 314, which corresponds to an approximate temperature of 180-185° C. It may also be said that this approximate midpoint of the transition between low modulus and high modulus is an inflection point for the curve, meaning that the second derivative ($d^2S/dT^2$) passes through zero.

Regardless of how the approximate transitional region is defined, it may be generally stated that a region 320 of plotted curve 310 represents a temperature range over which a significant shift occurs in an after-printing mechanical property as a function of the nozzle temperature at the time of printing.

As mentioned before, conventional practice is increasing nozzle temperature mainly to achieve flow and apparent interlayer adhesion. In view of plot 310 however, it is evident that the mechanical property inflection temperature represented by line 314 is well beyond the flowable temperature (indicated by line 312) by some 30° C. This means that, in order to attain the higher plateau of mechanical properties indicated by data points 334 and 336, a nozzle printing an ICP must be run far above what would seem to be an adequate nozzle temperature judging only by observing flow.

Other mechanical properties may be studied and may exhibit an inflection over roughly the same temperature range, including storage modulus at 60° C., loss modulus, impact resistance, elongation at break, etc. Nozzle temperature may be chosen based on exceeding a transitional temperature range for any of these mechanical characteristics or other measurable phenomena that transition non-linearly as a function of nozzle temperature.

The present teachings to select favorable extrusion parameters when printing ICP therefore emphasize that a nozzle temperature (or material discharge temperature) be adjusted at or above the temperature range at which a given ICP exhibits a transition (as in region 320) to a higher storage modulus or other desirable mechanical property. Of further note, whereas the melt, recrystallization and annealing temperatures of many polymer species are readily measurable with differential scanning calorimetry (DSC) and can provide guidance on processing temperatures, ICP polymer species may undergo such slow, low energy crystallization that the thermal transition is barely discernible in a DSC trace. The present teachings provide alternative indicators for converging on useful extrusion parameters when employing an ICP feedstock.

Figure 4:
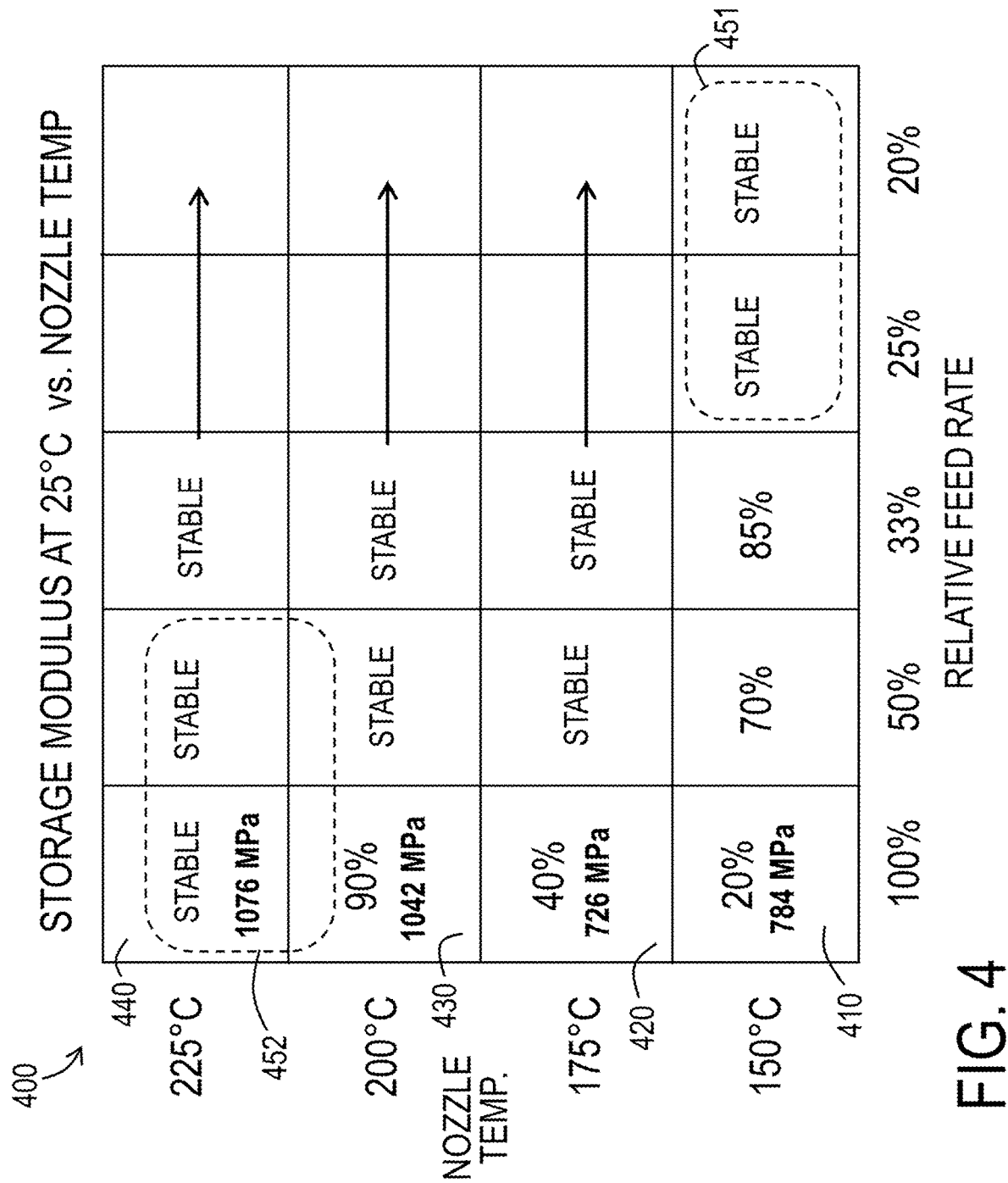
FIG. 4 is a table of stability observations and mechanical property data depicting an advantageous parametric region in accordance with exemplary embodiments of the present invention.

To facilitate a better understanding of this point, FIG. 4 presents a table 400, similar to table 200 shown in FIG. 2, but with added annotations for the storage modulus data that was presented in FIG. 3. Positions 410 and 420 are at temperatures below the inflection range and reflect low resulting storage moduli of around 750 MPa. Positions 430 and 440 are at nozzle temperatures above the inflection range and are annotated with storage modulus values above 1000 MPa.

Given this superimposed data, FIG. 4 allows for an overview of acceptable domains across the map of nozzle temperatures and printing speeds. Again, applying common practices would lead an operator of 3D printing no further than low nozzle temperatures and relatively slow printing speeds across the bottom row. A first domain of apparently usable extrusion parameters might be construed roughly as denoted by region 451. Because the lower nozzle temperatures here allow flow but do not surpass the inflection range that was introduced in FIG. 3, the resulting print would measure lower in a desirable mechanical property, such as storage modulus at room temperature and, conversely, would measure higher in an undesirable mechanical property such as loss modulus at room temperature.

In according with the present teachings, a separate and far more advantageous parameter domain 452 arises from the recognition that other disparate parameter combinations can achieve stacking stability, without compromising feed rate and while also improving mechanical properties such as storage modulus. On the low temperature side, domain 452 is bounded by a nozzle temperature (in this case, somewhere between 200° C. and 225° C.) at which 100% stability is achieved. In the horizontal axis, domain 452 at least encompasses the 100% feed rate (3618 mm/min) and may well extend leftward to higher feed rates and faster recoat times.

Once a nozzle temperature is selected on the basis of achieving stacking stability or exceeding an important inflection in mechanical properties (or both), then an efficient feed rate may be selected that will be significantly faster than the feed rate to which the process is relegated when the nozzle temperature is mistakenly thought to be limited to 150° C. or just above a flowable temperature.

Figure 5:
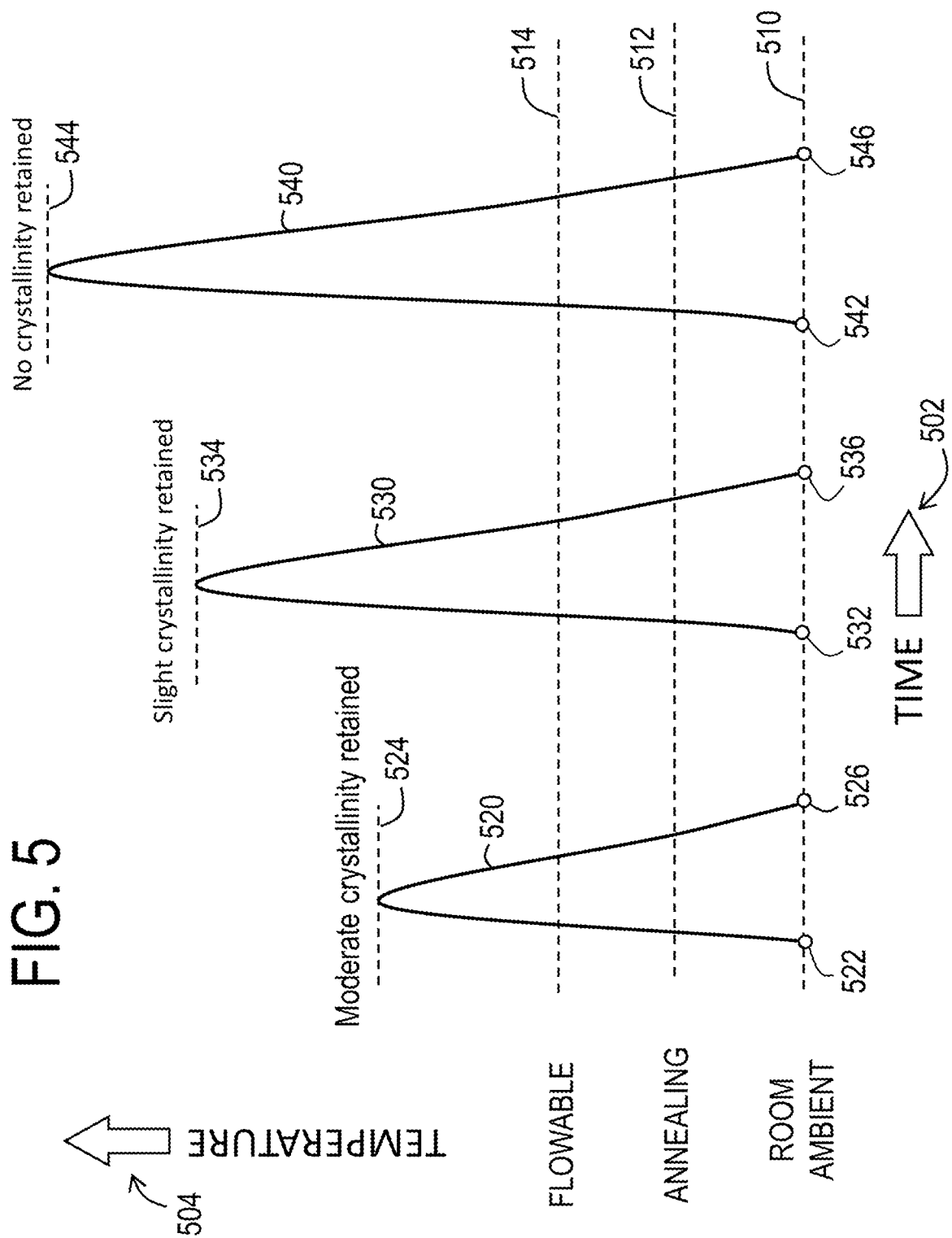
FIG. 5 is a graph presenting examples of time-temperature profiles that may be used for extruding an inhibited crystallization polymer in accordance with exemplary embodiments of the present invention.

To illustrate yet another potential consideration for selecting nozzle temperature, FIG. 5 depicts a series of temperature profiles as they may affect the crystallization state of an ICP after cooling. Each temperature profile 520, 530, 540 is plotted as a variation in temperature in a vertical axis (see arrow 504) as a function of time (see arrow 502). The final condition of the ICP undergoing these temperature profiles will be significant for later explanations.

Several landmark temperature levels, represented as horizontal dotted lines, are shown for reference. Room ambient temperature (see dotted line 510) is taken to be ≈25° C. and is the presumed starting temperature for a feedstock material before it is heated in preparation for extrusion. The flowable temperature (dotted line 514) for a given ICP is a temperature at which the ICP can be made to flow through whichever nozzle size is in use and under practical available driving pressure. The flowable temperature may vary somewhat with nozzle size and should take into account maintaining flow at expected extrusion feed rates. An annealing threshold temperature (dotted line 512) is an approximate temperature, such as a glass transition temperature, below which lack of molecular mobility prevents further crystallization.

A first temperature profile 520 represents the experience of a first sample of ICP material starting, at point 522, at an initial time, at room temperature and having an initial degree of crystallinity. For illustrative purposes, the initial crystallinity of this sample is presumed to be 10%. As indicted by the rise and fall of profile 520 as a function of time, the sample is heated beyond the flowable temperature (line 514) and to a further peak temperature (524) at which point the material may be deposited during an additive manufacturing process. After reaching this peak temperature, the first sample is depicted as rapidly cooling back to room temperature (at point 526) as might be the case when extruding into a non-heated environment. Some of the initial crystallinity of the sample may be lost as the ICP sample is heated to peak temperature (524) and then rapidly cooled to below the annealing temperature. Whereas many plastics would readily reestablish their native crystallinity upon cooling, an inhibited crystallization polymer (ICP) species may not be able to regain crystallinity as quickly and hence may return to room temperature (point 526) with greater amorphous character than was initially present at point 522. For as long as the sample is kept well below annealing temperature 512, the lost crystallinity will not recover or may do so at an extremely slow rate based on Maxwell-Boltzmann style temperature dependence. Given the comparatively brief and mild exposure to a nozzle temperature that causes crystalline domains to unravel, the first sample will be presumed to have retained half of its original crystallinity and will end up having 5% upon reaching point 526.

Similar to first temperature profile 520, a second temperature profile 530 commences with a second sample of the same ICP species starting at room temperature point 532, having 10% initial crystallinity. Profile 530 peaks out at a temperature level (534) higher than the peak level (524) indicated for the first sample in profile 520. The higher peak temperature more thoroughly energizes and randomizes the polymer molecules and, upon rapid cooling to point 536, the ICP material cannot effectively regain any crystallinity. For illustrative purposes, the peak temperature 534 will be assumed to have reduced the crystallinity to the second sample to only 2%.

A third temperature profile 540, cycling through initial conditions (point 542), peak conditions (point 544) and final conditions (546), is shown to reach an even higher peak temperature. It shall be presumed that peak temperature (544) effectively dissipates all crystalline arrangements in the polymer and that the subsequent rapid cooling yields a sample that is effectively amorphous and lacks any significant crystallinity.

Figure 6:
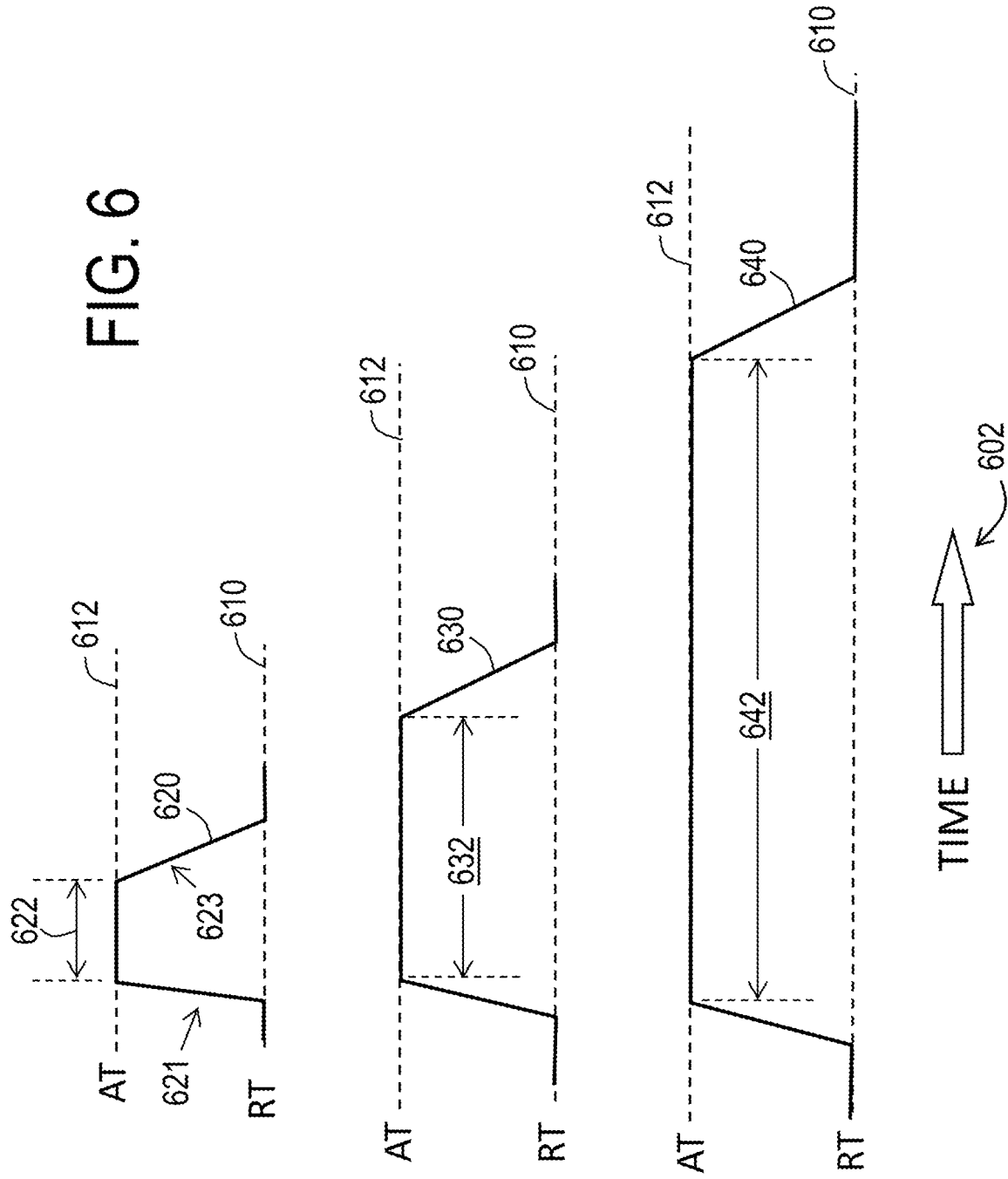
FIG. 6 is a graph showing alternative time-temperature profiles that may be used for annealing an inhibited crystallization polymer in accordance with exemplary embodiments of the present invention.

For explanation in conjunction with FIG. 5, FIG. 6 presents several temperature profiles for annealing, or effectively restoring crystallinity to, an ICP sample after it has experienced high nozzle temperatures as were presented in FIG. 5. FIG. 6 graphically presents three annealing profiles, all of which are plotted along a time axis 602 and each of which traverse between a room temperature level 610 and a selected annealing temperature level 612.

Profile 620 represents an annealing cycle for heating a sample (ramp up 621) up to an annealing temperature 612, maintaining the sample at the annealing temperature for a time period 622 and then allowing the sample to cool back to room temperature (ramp down 623). Time period 622 may be, for example, 30 minutes and the annealing temperature may be, for example, 80° C. The first sample in FIG. 5 that was subjected to temperature profile 520 and was left with 5% crystallinity may subsequently be annealed using profile 620 to restore its original 10% crystallinity and the mechanical properties that derive therefrom. If the first sample is exposed to the annealing temperature for longer periods of time (such as in profiles 630 or 640), it will simply crystallize to the maximum extent that it can, given the molecular structure, and this will generally lead only to slightly more desirable results rather than being detrimental.

For the second sample in FIG. 5 which experienced a higher peak temperature during profile 530 and was reduced to only 2% residual crystallinity before being cooled, a longer annealing profile, such as profile 630 with duration-at-temperature 632, may be required to return the sample to 10% crystallinity. Time period 632 may be, for example, one or two hours.

For the third sample in FIG. 5, after having essentially all crystallinity eliminated by exposure to temperature 544, an even longer annealing time 642 in annealing profile 640 may be needed to restore significant crystallinity. Time period 642 may be several hours. The spontaneous redevelopment of crystallization from a totally amorphous form may take considerably longer than for the other samples due to the lack of template nucleation sites.

Figure 7:
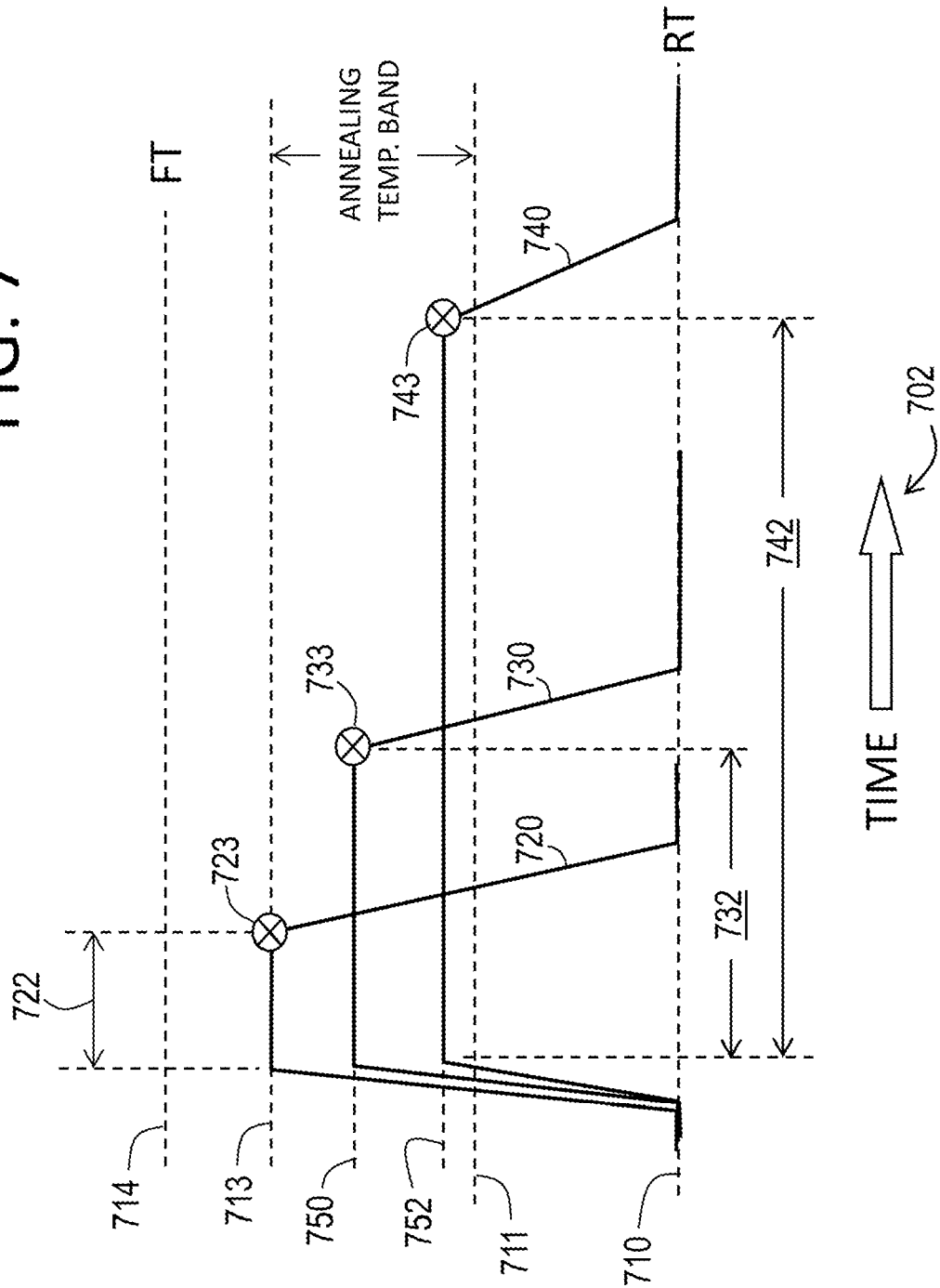
FIG. 7 is a graph showing alternative time-temperature profiles showing how annealing time may vary with annealing temperature when processing an inhibited crystallization polymer in accordance with exemplary embodiments of the present invention.

FIG. 7 depicts various annealing time-temperature profiles to illustrate another consideration in restoring a desired level of crystallinity in an ICP after it has been extruded. Three different profiles are plotted along a common time axis 702 and in the context of a common vertical axis representing three different temperature levels. Room temperature 710 is depicted as a lowest level and a band of annealing temperatures is bounded between a lower temperature limit 711 and an upper temperature limit 713. For reference, a minimal flowable temperature 714 is also represented.

A first profile 720 is shown to involve heating from room temperature up to the annealing band's upper temperature limit 713, and then maintaining the temperature for at least time span 722 at which point the ICP material is deemed to have achieved a satisfactory or a maximum achievable degree of crystallinity, as denoted at point 723. Any further time spent at this temperature does not appreciably affect the crystalline state of the ICP and it may optionally be cooled. This profile might be used, for example, to act upon the first sample in FIG. 5 and restore a higher a degree of crystallinity than was present in the material as it was first discharged from an extrusion nozzle.

A second profile 730 shows heating to a different temperature 750 having a value near the middle of the annealing band, which requires a longer time to allow for achieving a comparable ultimate level of crystallinity, denoted at point 733. The first sample in FIG. 5, may be equally treated to restore crystallinity to a given level but will require a longer time 732 of exposure to temperature 750.

A third profile 740 shows that a sample may be raised to yet another temperature near the lower annealing limit 711 and will require even longer (possibly exponentially longer) to achieve the same level of restored crystallinity. Even the first sample in FIG. 5, retaining some proportion of crystallinity, will require a more extended time of exposure 742 to attain a sufficient restoral of crystallinity indicated at point 743.

Figure 8:
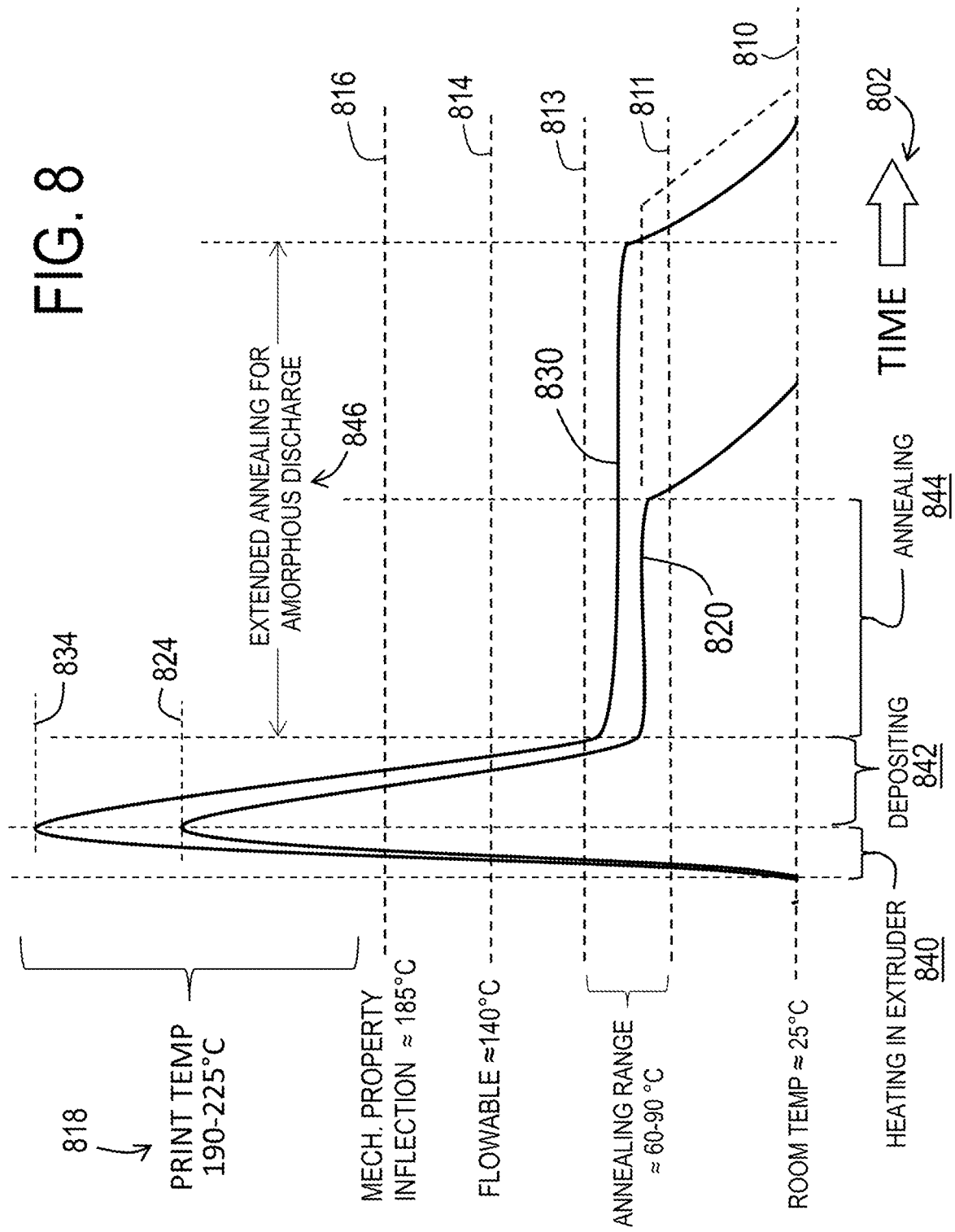
FIG. 8 is a graph of temperature versus time when extruding an inhibited crystallization polymer, incorporating both an extrusion phase and an annealing phase in accordance with exemplary embodiments of the present invention.

The concepts presented in FIGS. 5-7 culminate in recommended practical time-temperature profiles plotted in FIG. 8. Two example temperature profiles 820 and 830 are plotted as a function of time (see legend 802). In the vertical direction, several temperature strata are identified, starting with room temperature 810 of about 25° C. An annealing range of temperatures, from a lower limit 811 of about 60° C. to an upper limit 813 of about 90° C., is analogous to the annealing band described in FIG. 7.

At a still higher temperature, a flowable temperature 814, as defined elsewhere herein, is estimated at around 140° C. Above that, a nozzle temperature at which an inflection in mechanical properties ('inflection' temperature 816) is shown at about 185° C.

Taking into account this stack of temperatures and the corresponding phenomena of the ICP, a nominal print range 818 is set forth, for explanatory purposes, from 190° C. to 225° C. In preparation for printing using an ICP feedstock material, setting a nozzle within this range moves past the inflection threshold described in FIG. 3 and operates in the parameter domain 452 shown in FIG. 4 to realize stacking stability, high print speeds and resilient final parts.

Aside from printing within this advantageous range of nozzle temperature, both profiles 820, 830 are shown to cool to within the annealing range for a time rather than immediately to room temperature. (Based on the same understanding of ICP behavior presented above, an alternative process for intentionally producing amorphous deposits is also contemplated by starting with an amorphous feedstock and/or printing at a high nozzle temperature, then foregoing the annealing process and cooling the deposited material below the annealing temperature band as quickly as possible. The use of a heated bed or heated enclosure would also be contraindicated. Through careful control of temperatures in the build space, it may further be possible to apply amorphous layers on top of earlier deposited annealed layers.)

Although it was shown earlier that an amorphous ICP that had already cooled to room temperature could later undergo an annealing process (FIG. 6,7) to restore crystallinity, FIG. 8 represents a combined profile that is more practically implemented simply by performing the extrusion build within a heated enclosure. In other words, profiles 820 and 830 represent a temperature profile wherein a feedstock material enters a heated build environment and is heated to an extrusion temperature in a first phase (840), is discharged and deposited to become part of a growing build, at which point the extruded material cools in a second phase (842). In a third phase (844) under annealing conditions, the build, and therefore the newly deposited material, is maintained at an elevated temperature for as long as it remains in the heated build enclosure. In accordance with preferred embodiments, the build enclosure is maintained at a temperature within the characteristic annealing range for the ICP species being printed. In this manner, each extruded deposit will immediately begin the process of annealing and developing some structural strength by virtue of crystalline content, which may benefit support for subsequent layers as the build progresses. As alternatives to a heated enclosure, the crystallinity of the deposited ICP material may also be enhanced by directing a heated fluid such as temperature controlled hot air, onto the build or by placing the constructed object into a heated enclosure after the build. Furthermore, in the course of concluding a build even within a heated enclosure, some of the final traces may need annealing time so, rather than immediately remove the completed part, it may be advisable to leave the part in the heated enclosure for a period of time after the build has concluded. 3D printers (or the instructions controlling them) that normally shut off a heated enclosure upon concluding a build may be modified to provide a thermal holdover period when ICPs are printed.

The importance of enhancing crystallinity after printing, to pre-print levels or to ultimately achievable levels, is demonstrated by additional data point 338 in FIG. 3. This point, provided for reference, resulted from holding an extruded ICP sample at 80° C. for one hour after the conclusion of printing and achieved a room temperature storage modulus of greater than 1200 MPa.

Even though both profiles 820 and 830 operate in the desirable nozzle temperature range and then subject the deposited material to annealing temperatures, the profiles differ in terms of yet another parameter tradeoff.

Following profile 820, the peak temperature 824 is lower than for profile 830 and, as explained in conjunction with FIG. 6, the minimum required annealing time to improve or restore crystallinity is shown as the duration of third phase 844 (though not necessarily drawn to scale in time).

In contrast, because profile 830 involves a higher nozzle temperature, peak temperature 834 may significantly reduce the residual crystallinity in the ICP material, necessitating a longer annealing time 846 to recover a given level of crystallinity. Due to this influence, then, another consideration that may affect parameter selection is placing an upper limit on nozzle temperature to preserve some of the feedstock crystallinity and reduce annealing times.

In the context of the present teachings, it is further contemplated that a feedstock comprising an ICP species may be preconditioned, such as by exposure to annealing temperatures, before extrusion printing. Coupled with mild nozzle temperature settings, the higher initial crystallinity induced in the feedstock may be preserved to a greater extent and the post-deposition annealing burden may be reduced, allowing for faster builds of full-strength parts.

Figure 9:
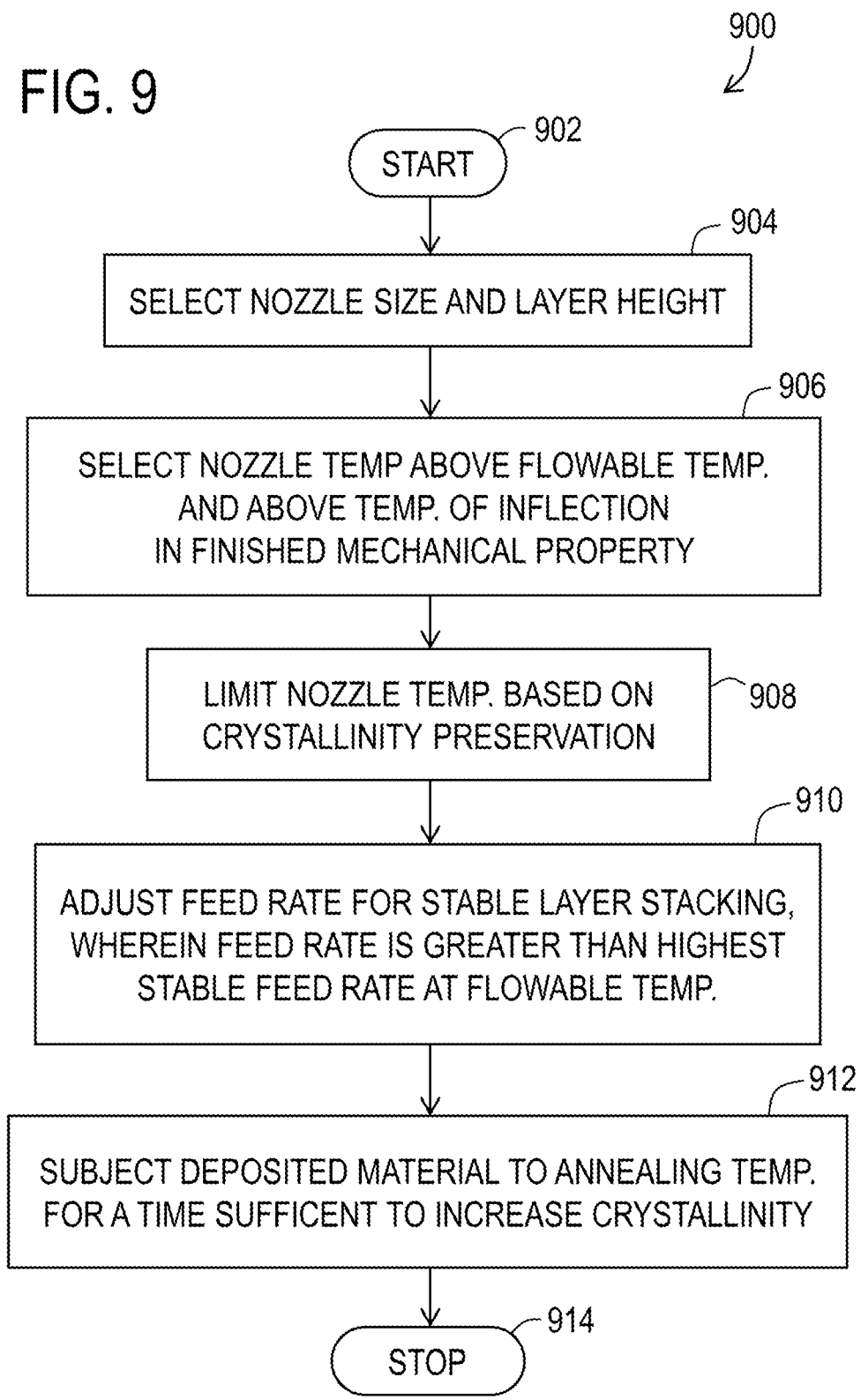
FIG. 9 is a process flow depicting actions for establishing extrusion parameters and otherwise processing an inhibited crystallization polymer in accordance with exemplary embodiments of the present invention.

FIG. 9 is a flowchart summarizing a process 900 for selecting print parameters for successfully and efficiently extruding an ICP into an object having uniformly semicrystalline mechanical properties.

Process 900 commences in step 902 upon the need to perform extrusion deposition using a particular ICP species. As of the commencement in step 902, a polymer species will have already been selected which exhibits an inhibited crystallization characteristic. One such characteristic may be a solidification temperature being at least 15° C. below a fusion temperature for the polymer. Another characteristic of the polymer indicating treatment as an ICP may be having a solidification temperature below 130° C. Structural aspects considered as inhibited crystallization characteristics include sidechains and sparse or randomized placement of functional groups along the polymer chain. A polymer may also exhibit an inhibited crystallization characteristic in terms of being easily supercooled and having both a stable amorphous state at room temperature and a stable semicrystalline state at room temperature.

Execution continues with step 904 wherein more specific conditions of nozzle size and layer height are established, as these factors will influence process behavior in later steps. For example, flowable nozzle temperatures may be affected by changing nozzle size and stable layer stacking and achievable feed rates may depend on nozzle size and layer height.

Next, in step 906, a nozzle temperature is chosen that exceeds the flowable temperature for the ICP and, furthermore, exceeds a temperature at which the ICP material exhibits an inflection in a mechanical property. The rationale for the latter was explained in FIG. 3. As discussed in explaining domain 452 in FIG. 4, the nozzle temperature is preferably also adjusted upward, if necessary, until 100% stacking stability is achieved.

Step 908 refers to the option of limiting the nozzle temperature to preserve some crystallinity and reduce annealing time as was explained in connection with FIG. 8. Although this is a useful consideration, an operator of a 3D printing process may elect to not explicitly limit this temperature and opt for possibly prolonged annealing hold times or reduced crystallinity in the final product.

Once the nozzle temperature has been decided, step 910 is performed in the context of the ICP's behavior at the chosen nozzle temperature to adjust feed rate (and recoat times, where applicable) to an acceptably fast level while still producing stable stacking of extruded traces. Note that, with the nozzle temperature chosen in accordance with step 906, the achievable feed rate will be considerably faster than what could be achieved at a minimal flowable temperature. (This is evident in comparing parameter domain 451 to parameter domain 452 in FIG. 4.)

As explained in FIG. 8, an extruded ICP deposit is preferably annealed to redevelop crystallinity. Step 912 pertains to subjecting the deposited material to an annealing temperature for a sufficient period of time to increase the crystallinity beyond what the material would be without annealing, which is also very nearly the crystallinity present in the material as it is discharged from the nozzle. This action corresponds to annealing phases 844 and 846 in FIG. 8. Disregarding this annealing may yield a printed product that is mainly amorphous or that is inhomogeneous in its crystallinity, strength and appearance.

Process 900 concludes in step 914 upon the key parameters for extruding ICP having been established.

Whereas the foregoing instructions have provided for achieving substantial, uniform crystallinity in deposited ICP material, it is also noted that, based on the same understanding, a homogeneous amorphous final form is also controllably achieved by carefully selecting alternative build conditions.

Figure 10:
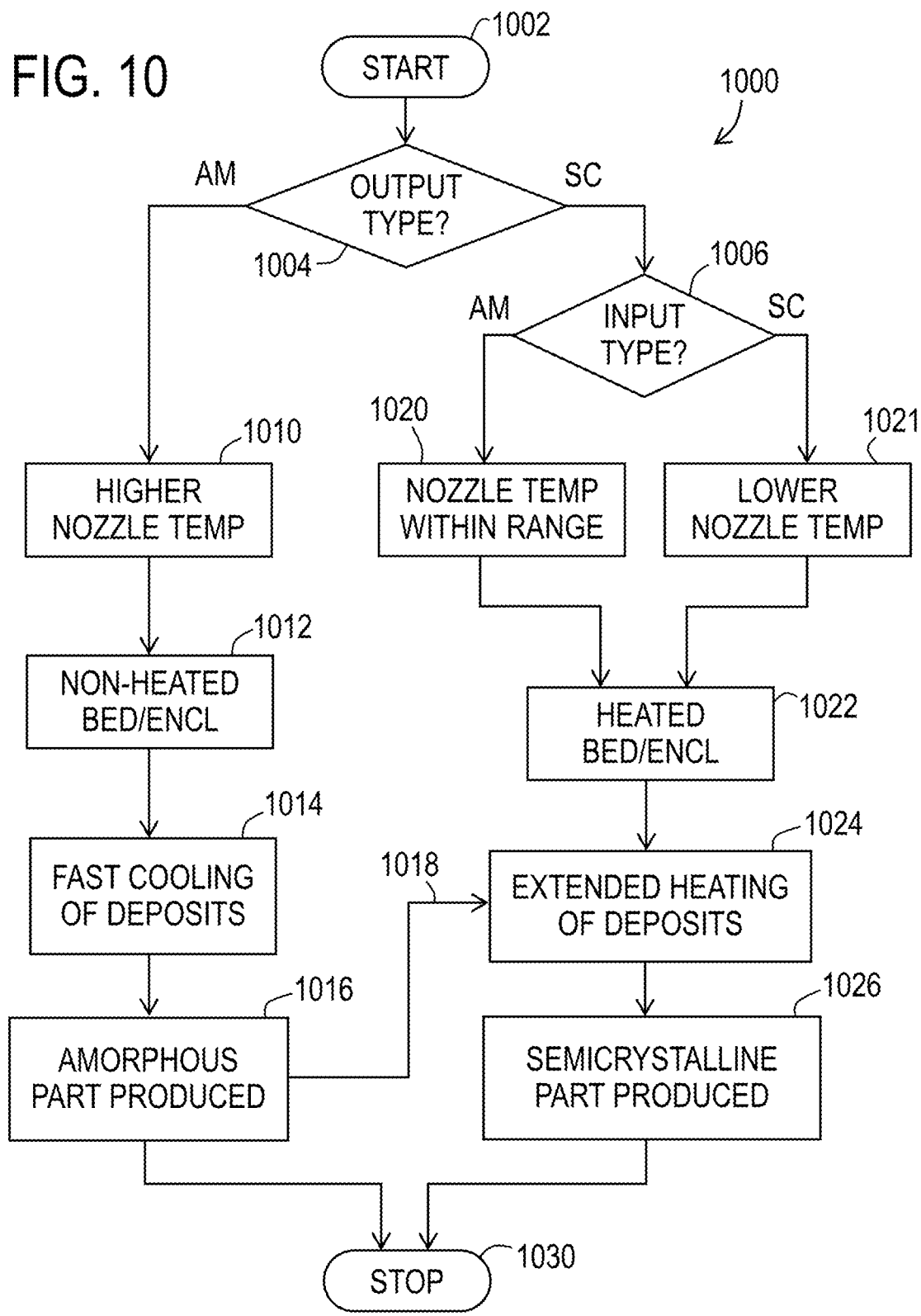
FIG. 10 is a process flow describing actions for selectively producing either an amorphous part or a semicrystalline part when extruding an inhibited crystallization polymer in accordance with exemplary embodiments of the present invention.

FIG. 10 provides a generalized process 1000 for starting with a given ICP feedstock and following a pathway of parameter selection and build conditions to create either a uniformly amorphous additively manufactured part or a uniformly semicrystalline additively manufactured part having nearly the maximum degree of crystallinity possible for the given molecular composition.

Process 1000 commences with step 1002 with a particular ICP feedstock having been selected as the context. Executed next, step 1004 corresponds to the decision as to whether an amorphous part ('AM') or a semicrystalline part ('SC') is to be produced. This choice leads to significantly different treatments, some of which might otherwise be interchangeable for extruding more conventional, non-ICP feedstocks.

If, in step 1004, an amorphous final state is desired, then a course of conditioning is recommended as shown in steps 1010 through 1014. In step 1010, a higher nozzle temperature is recommended to leverage the benefit of operating in parameter domain 452 as was depicted in FIG. 4 and to effectively energize the material so much that any crystalline character is driven out as was explained for temperature profile 540 in FIG. 5. The reference to 'higher' nozzle temperature in step 1010 means a temperature that acts to reduce crystallinity and is tolerated by the material. Of course, this temperature will vary by ICP species. It is worth noting that the raw feedstock ICP may be supplied in an amorphous state or may have some initial crystallinity. The selection of a higher nozzle temperature (on the high end of the range within domain 452, for example) is intended to intake material having any degree of initial crystallinity and to render a substantially amorphous form as discharged from the extruder nozzle.

After material has been discharged in an amorphous form, the goal becomes preserving the amorphous state and preventing annealing. This involves quickly returning to cooler temperatures after deposition, as typified by profile 540 in FIG. 5. Non-ICP materials spontaneously recrystallize upon cooling so that this kind of control is not available. For an ICP material, rapid cooling of any newly deposited materials to below a minimum annealing temperature (such as lower temperature limit 711 in FIG. 7) becomes practical. As indicated in step 1012, temperatures of the build surface and surrounding enclosure should be kept low, such as at room temperature. If first-layer adhesion to the build surface needs to be enhanced, then other measures, such as chemical surface coatings, are advised in lieu of heating the build surface. In addition to heated enclosure and heated bed or build surface being contraindicated for an amorphous build, step 1014 relates to available further actions to promote fast cooling of deposited materials, including such measures as forced-air cooling and eliminating any infrared-reflecting surfaces near the build. To prevent cumulative heat buildup for certain object shapes, the feed rates or recoat times may need to be adjusted to assure that each previously deposited layer is sufficiently cooled before a subsequent heated layer is applied. The addition of heat to the workpiece by successive deposits must not suspend the cooling process in some areas and effectively create a localized environment of prolonged annealing temperature. For some ICP materials, this occurrence may be detectable by the development of translucent areas in an otherwise transparent build. Another consideration in some circumstances is that concurrently building a batch of multiple parts on the build surface allows for prolonged cooling time for each part, even though the extruder nozzle remains active and productive. This may sometimes motivate printing multiple identical parts, arranging widely spaced parts or combining print jobs for temperature management.

As indicated by step 1016, the final result of this pathway of recommendations in operating a build process is an amorphous part, which will often have dramatically different characteristics than a semicrystalline build for the same part shape. Process 1000 may then conclude as represented by step 1030. Alternatively, as indicated by arrow 1018, the amorphous part yielded in step 1016 may be subjected to a subsequent annealing process in step 1024 and yield a semicrystalline part as in step 1026. Although possible in some instances, this processing route may be disadvantageous for many practical build shapes because the mechanical integrity of the amorphous form may not develop quickly enough to provide support where needed and the part may sag.

Returning to decision step 1004, if a semicrystalline form is desired, then the next consideration is taken up in decision step 1006 to differentiate subsequent processing based on whether the supplied ICP feedstock is already amorphous or already semicrystalline. Referring to the descriptions of FIG. 5 and FIG. 8, some preservation of existing crystallinity may be possible with milder nozzle temperatures and may reduce the time required to anneal the deposit material. To leverage this possible efficiency, step 1006 directs to the use of lower nozzle temperatures by way of step 1021 when the input feedstock is semicrystalline and some preservation of crystallinity is preferred. The 'lower nozzle temp' in step 1021 refers to, for example, choosing a temperature within the range of parameter domain 452 and preferably towards the lower end of that range.

If, in step 1006, the input feedstock is determined to be mainly amorphous, then there is no crystallinity to preserve and, in accordance with step 1020, any nozzle temperature within a range, such as that encompassed by parameter domain 452, may be chosen. The actual nozzle temperature may be chosen to optimize other factors, such as stacking stability at higher feed rates.

As shown by step 1022, whether the nozzle temperature is guided by step 1020 or step 1021, the next aspect to promote crystallinity of deposited materials is to utilize either or both of a heated enclosure and a heated bed or build surface. As explained in connection with FIG. 8 previously, having the newly deposited material cool to within an annealing range of temperatures, rather than to room temperature, allows for the development of crystallinity and mechanical strength as the build progresses. Step 1024 relates to optional further measures to allow for annealing, including, singly or in combination, directing heated air or radiant energy to new deposits, allowing the manufactured part to remain in the heated enclosure for a time after build completion and placing the finished part into a separate oven at annealing temperatures after the part is completed.

Upon completion of an additive manufacturing build and any optional post-processing set forth in steps 1020-1024, the resulting part will be uniformly semicrystalline as indicated in step 1026, whereupon process 1000 is deemed complete in step 1030. The benefit of thorough annealing by following this latter processing pathway is evident, for example, by the remarkably higher storage modulus of around 1200 MPa for data point 338 in FIG. 3.

In the preceding description, various principles and exemplary embodiments have been described with reference to the accompanying drawings. It will be evident, however, that various modifications and changes may be made thereto, and additional embodiments may be implemented, without departing from the scope of the invention as set forth in the claims that follow. The description and drawings are, therefore, to be regarded in an illustrative rather than a restrictive sense.

What is claimed is:

1. A process for forming a finished object in an additive manufacturing system by extruding a polymeric feedstock from a heated extrusion nozzle while moving the nozzle to deposit the feedstock in a specific pattern according to a digital data model describing a shape of the finished object, the process comprising:

selecting, as the polymeric feedstock, a thermoplastic exhibiting at least one inhibited crystallization characteristic; and during at least a portion of the extrusion procedure to build the object, extruding the thermoplastic using a target extrusion temperature that exceeds both a first minimum temperature at which the thermoplastic becomes flowable through the nozzle and a second temperature, greater than the first temperature by at least 10° C., at which an inflection occurs in at least one post-printing mechanical property as a function of extrusion temperature for the thermoplastic;

wherein the at least one inhibited crystallization characteristic comprises the thermoplastic having polymer chains with aperiodic spacings between polar functional groups.

2. The process of claim 1 wherein the post-printing mechanical property comprises at least one of: elastic storage modulus measured at room temperature, elastic storage modulus measured at 60° C., loss modulus, elongation at break and normalized crystallinity.

3. The process of claim 1 further comprising:
applying heat to maintain the extruded thermoplastic at a temperature above its glass transition temperature for a sufficient time to reach a second level of crystallinity in the thermoplastic material greater than a first level of crystallinity present in the thermoplastic when initially extruded.

4. The process of claim 1 further comprising:
adjusting a first printing speed of the system to achieve a stable stacking of progressive layers of the extruded thermoplastic when the nozzle is operated at the target extrusion temperature.

5. The process of claim 4 wherein the first printing speed is greater than a second maximum printing speed at which the system achieves a stable stacking of progressive layers of the extruded thermoplastic when the nozzle is operated within 25° C. of a minimum flowable temperature.

6. The process of claim 4 further comprising:
applying heat to maintain the extruded thermoplastic at a temperature above its glass transition temperature for a sufficient time to reach a second level of crystallinity in the thermoplastic material greater than a first level of crystallinity present in the thermoplastic when initially extruded.

7. The process of claim 1 further comprising:
applying heat to maintain the extruded thermoplastic at a temperature above its glass transition temperature for at least a period of time sufficient to increase a second room temperature elastic storage modulus of the thermoplastic above a first room temperature elastic storage modulus exhibited by the thermoplastic upon being cooled to below its glass transition temperature immediately after extrusion.

8. The process of claim 7 wherein the applying of heat is by extruding the thermoplastic within a heated enclosure of the additive manufacturing system.

9. The process of claim 7 wherein the applying of heat is by subjecting the formed object to a heated environment.

10. The process of claim 1 wherein the inhibited crystallization characteristic comprises a solidification temperature for the thermoplastic being below 130° C.

11. The process of claim 1 wherein the inhibited crystallization characteristic comprises polymer chains of the thermoplastic having side chains.

12. The process of claim 1 wherein the inhibited crystallization characteristic is evidenced by the thermoplastic having, as a first form, a stably amorphous form at room temperature and, as a second form, a stably semicrystalline form at room temperature and by an ability to be transformed between the first and second forms by exposure to temperature conditions within the additive manufacturing system.

13. The process of claim 1 further comprising:
monitoring stability of stacked extrusion deposits after the deposits have been discharged from the nozzle during the build process;
detecting instability of the stacked extrusion deposits of the thermoplastic; and
responsive to the detecting instability, increasing the nozzle temperature to reduce the instability.

* * * * *